United States Patent

Kairi

[11] Patent Number: 5,507,905
[45] Date of Patent: Apr. 16, 1996

[54] DIAGONAL VENEER LAMINATE

[76] Inventor: Matti Kairi, Lövinginkatu 3, SF-08100 Lohja, Finland

[21] Appl. No.: 964,880

[22] Filed: Oct. 22, 1992

[30] Foreign Application Priority Data

Nov. 18, 1991 [FI] Finland .................... 915437

[51] Int. Cl.⁶ .................................................. B31B 31/10
[52] U.S. Cl. .................... 156/264; 156/265; 156/266; 156/297; 156/299; 156/300; 428/106; 428/112; 428/114
[58] Field of Search .................... 156/559, 563, 156/92, 71, 60, 91, 228, 250, 297, 256, 260, 263, 299, 300, 303, 157, 159, 191, 258, 259, 266, 304.1, 304.5; 428/106, 112, 114

[56] References Cited

U.S. PATENT DOCUMENTS

| | | | |
|---|---|---|---|
| 2,386,821 | 10/1945 | Tardiff | 156/304.1 |
| 2,582,065 | 1/1952 | Rasor | 156/304.1 |
| 3,903,943 | 9/1975 | Hasenwinkle | 144/314 R |
| 3,961,654 | 6/1976 | Hasenwinkle | 144/314 R |
| 3,989,078 | 11/1976 | Hasenwinkle | 144/314 R |
| 4,012,548 | 3/1977 | Roberti | 428/106 |

FOREIGN PATENT DOCUMENTS

| | | | |
|---|---|---|---|
| 0470441 | 1/1951 | Canada | 156/266 |
| 0361796 | 4/1990 | European Pat. Off. | 156/91 |
| 1243219 | 8/1960 | France . | |
| 800993 | 12/1950 | Germany . | |
| 350169 | 6/1931 | United Kingdom . | |

OTHER PUBLICATIONS

Partial English language translation of German Patent No. 800 993.

Primary Examiner—Peter Chin
Attorney, Agent, or Firm—Klarquist Sparkman Campbell Leigh & Whinston

[57] ABSTRACT

The invention relates to a diagonal veneer laminate structure consisting of several superposed veneer layers (1a, 1b, 1c . . . ) glued to each other. In each veneer layer (1a, 1b, 1c . . . ), the main grain (S1 or S2) is disposed to form a crossing angle (α) with the main grain (S2 resp. S1) of immediately adjoining veneer layers (1b; 1a and 1c) which is in the range of 3° to 60°.

11 Claims, 2 Drawing Sheets

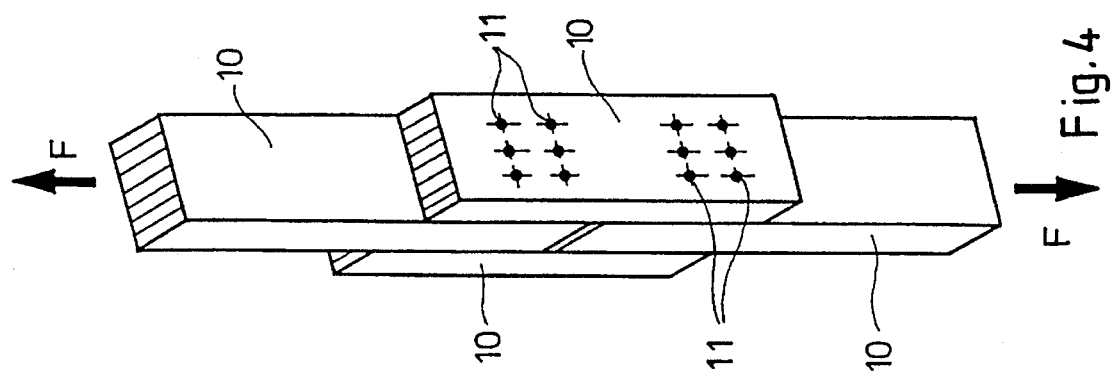
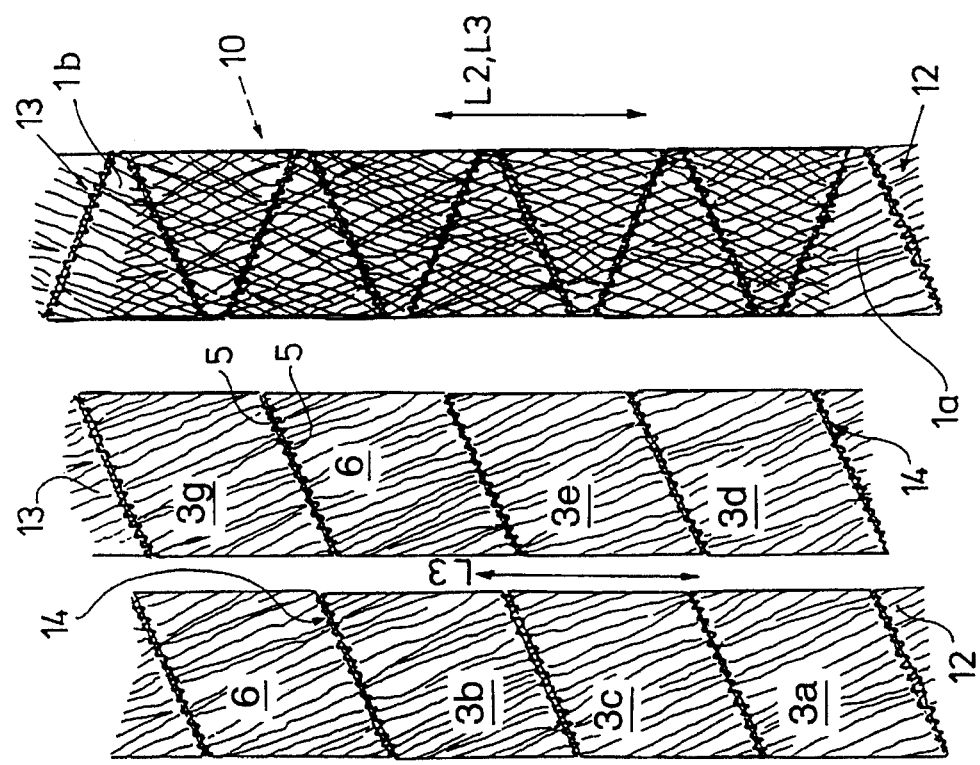

DIAGONAL VENEER LAMINATE

The invention relates to a veneer laminate structure consisting of a plurality of superposed veneer layers with their surfaces glued to each other. The invention also relates to a method for manufacturing such a veneer laminate.

BACKGROUND OF THE INVENTION

Conventional wood laminates consist of a plurality of superposed, fairly thin or fairly thick veneer layers glued to each other, in which the main grains of the laminates are parallel as far as possible. The grains of the individual laminates vary maximally two degrees at random, when all the laminate layers are compared to each other. Hence, the aim of wood laminates is to copy a beam or similar of solid wood, however with a more homogeneous structure. The strength of current wood laminates in a beam has been developed to top performance, and in fact, they are mainly used precisely as beams, in which the main grain joins the longitudinal direction of the beam. The tensile strength and bending strength in the fiber direction of such a laminate beam are extremely high and the statistical deviation of the strength values of the products is very reduced. Some structures, however, involve problems for other reasons. When beams are connected with pin joints, such as bolts or nail plates, the transverse tensile strength will become the dominating strength with regard to the fiber direction. In such situations, a laminate will behave in the same way as a solid wooden beam. When nail plates are being used, the beam tends to crack in the fiber direction at the nail points, and under tensile stress, the beam tends to tear at the point of the pins, such as bolts. In this case, the dimensions of the wooden beam must be great enough to produce a sufficient joint area, although the load would allow a lower beam at other points. When a laminate is used as a beam of an I section, it tends to shear next to the glued joints in their direction, this phenomenon being known as plane shearing.

As a second option, plywood is used for some of the purposes described above, in which the alternating veneer layers form an angle of approx. 90° with each other. As a matter of time, the strength of plywood deteriorates under the effect of moisture variations, and this is also a quite serious shortcoming. In addition, the tensile and bending strength of plywood is only of the order of approx. one third of the respective strength of straight wood laminate, which in many places causes an unnecessary coarse dimensioning.

SUMMARY OF THE INVENTION

The object of the invention is thus to provide a veneer structure reminding of wood laminate, having a tensile and bending strength at least essentially equal to that of a wood laminate, in which the main grain is parallel throughout the laminate. A second object of the invention is to provide a veneer structure, which has an essentially better transverse tensile strength than conventional wood laminates in view of pin joints, as well as of the strength of the spar of an I section. A further object of the invention is to achieve a veneer structure, which has a substantially better resistance to moisture variations than plywood, and a shearing resistance of the interfaces between the various veneer layers which is better than that of conventional wood laminates or conventional plywood.

The drawbacks described above are eliminated and the objectives defined above are achieved with a veneer laminate structure according to the invention.

The main advantages of the invention consist in providing an improved transverse tensile strength with regard to the average grain, simultaneously with enhanced shearing resistances in various directions. A further basic advantage of the invention is that the veneer structure concerned has a very low splitting tendency in the fiber direction at the point of nails or nail plates, or pin joints, such as bolts. Moisture variations do not either deteriorate the strength of such a veneer structure noticeably. Still another advantage consists in significantly smaller deflections than what can be achieved with conventional wood laminates.

The invention will be described in further detail below with reference to the enclosed figures.

BRIEF DESCRIPTION OF THE DRAWINGS

FIG. 3A shows two veneer sheet webs for manufacturing the veneer laminate according to the invention with a second method.

FIG. 3B illustrates the structural principle of the veneer laminate obtained with the method of FIG. 3A, the veneer layers being represented as transparent.

FIG. 4 is an axonometric view of a joint, in which the advantages of the invention appear.

DETAILED DESCRIPTION OF THE INVENTION

Figure 1:
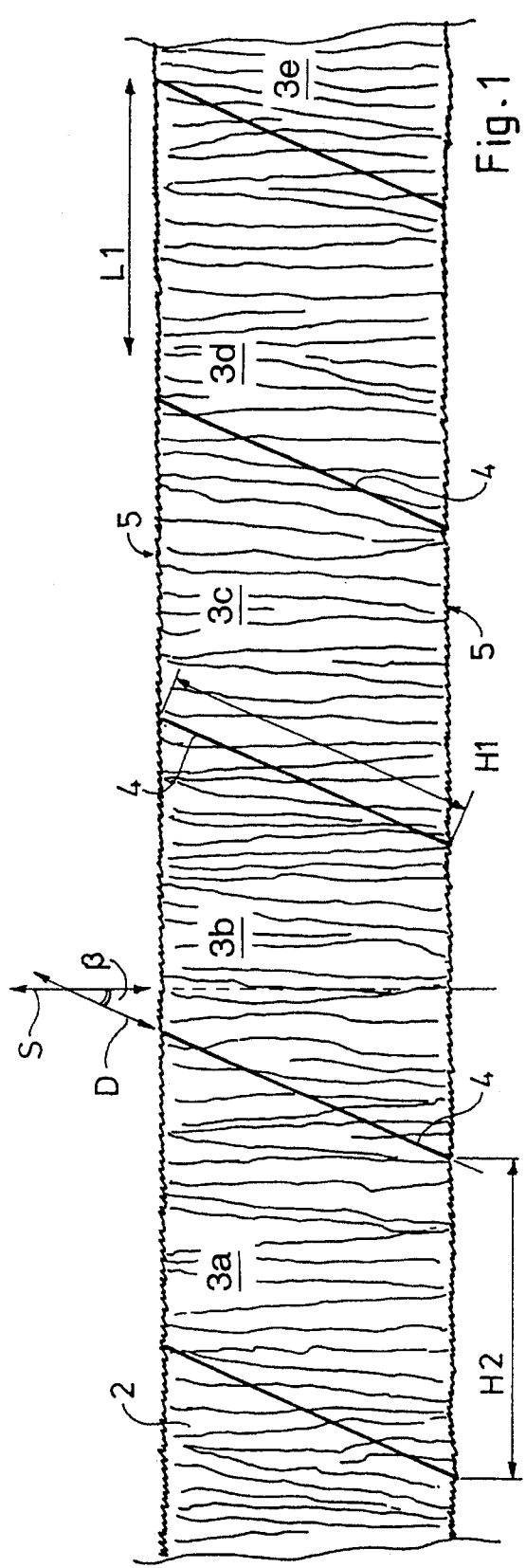
FIG. 1 shows a veneer web, from which veneer sheets for the veneer laminate according to the invention are cut out.

FIG. 1 shows a veneer web 2, from which the laminated veneer lumber 10 according to the invention can be manufactured. Such a web 2 is produced for instance during the turning of a log or by glueing veneer sheets into a web in a manner known per se, for instance in the manner described in FI patent specification 78255. This veneer web 2 has longitudinal sides 5 and a main grain S, which in this case is essentially perpendicular to the longitudinal sides 5 of the veneer web, and simultaneously perpendicular to the length L1 of the veneer web. From this veneer web 2, veneer sheets 3a, 3b, 3c, 3d etc. are cut slightly diagonally from the cutting points 4. The direction D of the cutting points 4 forms a section angle β with the main grain S. In addition, the sheets 3a, 3b, 3c . . . are advantageously cut so that the total length H1 of each cutting point equals the length H2 of the sheet in the longitudinal direction of the veneer web L1, i.e. H1=H2.

Figure 2:
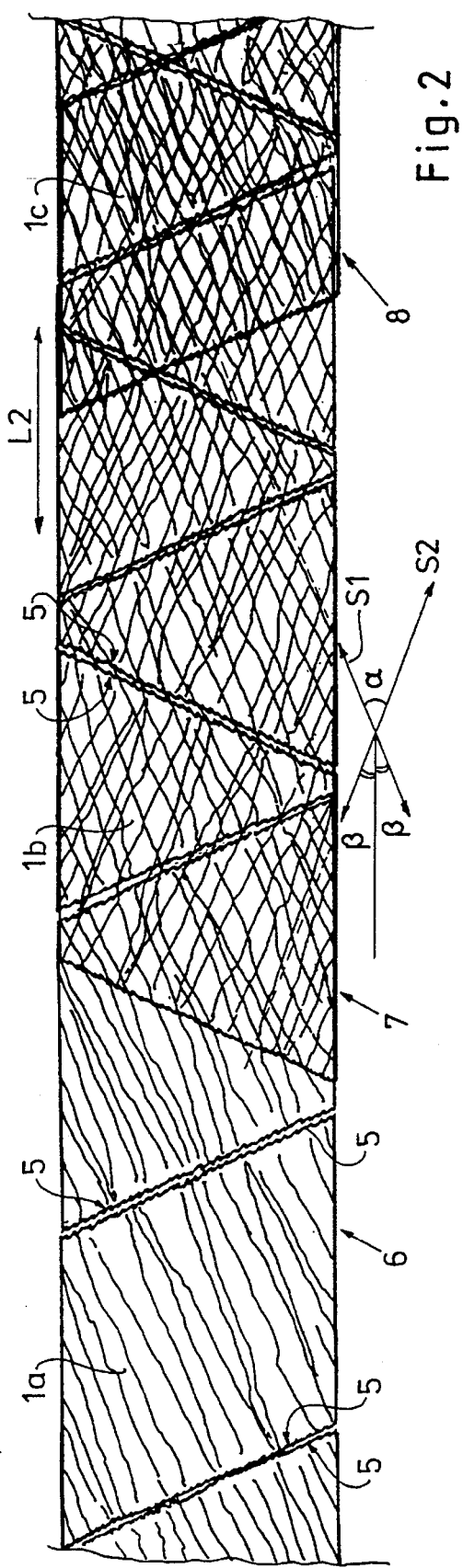
FIG. 2 is a top view of the structural principle of the veneer laminate according to the invention, the different veneer layers being represented as transparent and manufactured with one method according to the invention.

When the sheets 3a, 3b, 3c . . . are turned approx. 90° about an axis perpendicular to their plane, and so that the sides of the sheets corresponding to the edges 5 of the original veneer web 2 will join, a new veneer sheet row 6 is formed, which has essentially the same width as the original veneer web 2, but in which the grain S, i.e. in this case the grain S1, forms an angle −β with the longitudinal direction L2 of this veneer sheet row 6. Such a veneer sheet row 6 is shown on the left in FIG. 2, the sides of the sheet corresponding to the edges 5 of the original veneer web clearly joining and the grain having turned closer to the longitudinal direction L2 of the sheet row 6. On top of this first veneer layer 1a intended for the veneer laminate 10, a second veneer layer 1b is piled, immediately adjacent or subjacent to the veneer laminate, as a second veneer sheet row 7. This second veneer sheet row 7 is formed from the sheets 3a, 3b, 3c . . . of the original veneer web 2 by turning the sheets 180° about an axis passing through their plane as well as approx. 90° about an axis perpendicular to their plane, so that the sides of the sheet corresponding to the edges 5 of the original veneer web will join. Thus, a second veneer layer 1b is produced, having a main grain S over its entire length, in this case the grain S2 forming an angle +β with the longitudinal direction L2 of the sheet row. This veneer layer 1b is thus of the same type as the layer 1a, except that the main grain S2 was directed to the right of the longitudinal direction L2 of the row, whereas the main grain S1 of the first veneer layer 1a was directed to the left of the length L2 when viewed from the left to the right in FIG. 2. Consequently, the angle between the main grains S1 resp. S2 of these two veneer layers is 2β, marked with the crossing angle α. In this case it is then true that the angle between the main grains of two successive veneer layers α=2β. This second veneer layer 1b can be seen in the center of FIG. 2 shown on top of the layer 1a, illustrating clearly how the crossing angle α is formed.

On top of these two first veneer layers 1a and 1b, a third veneer layer 1c is disposed, which is formed of a row 8 of veneer sheets, which are turned approx. 90° about an axis perpendicular to their plane, when starting from a veneer web 2 of the type of FIG. 1, i.e. from its sheets 3a, 3b, 3c, 3d etc. Thus, the grain of this third veneer layer 1c is identical to the grain S1 of the first veneer layer 1a and their row 8 is of the same type as the row 6. On top of this a veneer layer 9 not shown in the figure is disposed as the row 9, which consists of sheets turned in the same way as the second layer 1b, whereby the veneer sheet row 9 is of the same type as the veneer sheet row 7 and has a main grain that is identical to that of the second veneer sheet row 7, the direction S2. Thus, one proceeds accumulating veneer layers 1a, 1b, 1c, 1d etc. alternatingly of the type of the first row 6 and of the second row 7 until the desired thickness of the veneer laminate 10 has been reached. After this, the veneer layers of the laminate formed of veneer sheet rows are glued to each other by any method known per se, appropriate for glueing such veneer layers. The glueing naturally also involves an application of the desired glue or a component of it on the veneer surface before the veneers are piled into rows in tiers or before the glue layer is applied between the veneer layers during the piling. Thus, this glueing method needs no further discussion in this context. It is obvious that when veneer layers are being piled alternatingly on top of each other, a row of the type of the veneer sheet row 7 can be used as a start, by disposing a row of the type of the veneer sheet row 6 on top of this and by proceeding by accumulating alternatingly veneer sheet rows of the two types, until the desired thickness of the veneer laminate has been obtained.

According to the invention, the essential feature of the structure described above is that the crossing angle α between the main grains S1, resp. S2 of the successive veneer layers 1a and 1b; 1b and 1c; 1c and 1d is in the range of 3° to 60°. The described structure is called a veneer laminate. In the first embodiment of the invention, the crossing angle α between the grains of superposed veneer layers is in the range of 4° to 20°, and advantageously in the range of 5° to 12°. Consequently, the grains S1 and S2 occuring in the two veneer layers form relatively small section angles β with the longitudinal direction L2 of the veneer laminate. It is also conceivable to choose as length L2 of the veneer laminate the direction, on both sides of which the main grains S1 and S2 of the veneer layers 1a, 1b, 1c are oriented in equal section angles β, the total angle between the grains being the crossing angle α. Therefore, the main grains S1 and S2 are symmetric about the length direction L2 of the laminated veneer lumber. According to test results, the crossing angle α being approx. 8°, the tensile and compression strength of a smooth, unbroken veneer laminate in the direction L2 will remain essentially the same as that of a smooth and unbroken veneer laminate, in which the grain coincides with the length of the laminate entirely. When wood is loaded for instance with the pin joint appearing in FIG. 4, a perfect representation of both a bolt joint and a nail joint, the compression strength of the veneer laminate according to the invention will be approx. 25% better and the ultimate tensile strength approx. 33% better than those of corresponding conventional laminates, in which the grain joins the length of the wood. In the joints, the displacements (deformations) during tension as well as compression are less than half of the values for conventional laminates, so that the bendings in the load zones allowed in lattice structures for instance are less than half of the solutions in prior art. The superiority of the claimed veneer laminate can be explained by the fact that the angle between the grains spreads the effect of the pins 11 on a larger area in the veneer laminate, so that it does not cut the laminate as easily in the load direction F. The bending strength of the veneer laminate according to the invention is approx. 10 to 15% smaller than in conventional wood laminates, however this has no significance, since the bending strength of an unbroken beam is hardly ever the most critical value in typical uses of such wood. In fact, the improved compression strength and tensile strength in the joints allow to essentially reduce the dimensions of the wood laminate required in the respective cases. As a matter of fact, one could contend that the wood laminate of conventional structures has had an excessive strength with regard to bending as well as to the tensile and compression strength of the unbroken beam, the strength of the joints having been the crucial value. Thus, the invention enables to achieve an optimization of the structures, approaching the correct values, since the invention expressly increases the strength achieved in finished joints and reduces the bending.

If, on the other hand, the crossing angle α between the main grains S1 and S2 of superposed veneer layers is in the range of 20° to 40°, a structure is provided which replaces conventional plywood in many applications. The veneer laminate of this very embodiment has significantly smaller negative effects caused by moisture variations. When used as the spar of an I section, the characteristics of such a structure are considerably better than those of plywood. This is understandable, considering that the load in the direction of some plywood layers in the web severely destroys the layers with a transverse grain. The veneer laminate according to the invention does not, however, involve such tearing. In addition, the moisture life in the web made of the veneer laminate according to the invention is basically similar to that of the upper and lower spar of the beam, the elements being thus well kept together, unlike conventional structures.

FIGS. 3A and 3B show another way of manufacturing the veneer laminate 10 according to the invention. In this method, veneer sheet rows 6 are formed out of the veneer sheets 3a, 3b . . . obtained according to FIG. 1, by turning them e.g. approx. 90° about an axis perpendicular to their plane and by subsequently placing them so that the edges of the sheets corresponding to the edges 5 of the original veneer web 2 will join. Rows of the type 7 described above can of course also be formed by turning the veneer sheets 3a, 3b . . . 180° about an axis in their plane. There are at least two veneer sheet rows 6 and 7 at a time and they are formed into veneer sheet webs 12, 13 by glueing together the joining edges 5 of the sheets with seams 14. By disposing the veneer sheet web 12 subsequently as the first veneer layer 1a of the veneer laminate, the second veneer sheet web 13 will form the second veneer layer 1b of the laminate by turning it 180° about an axis in the longitudinal direction L3 of the web, and by placing it on top of the first veneer layer in the direction of the length L2, as shown in FIG. 3B. This procedure is continued, by alternatingly accumulating webs of the type of veneer sheet webs 12 and 13 until the desired thickness of the laminate has been reached. After this, the veneer sheet webs are glued together by some known method, as described above. It should be noted that webs of the type of the veneer sheet web 13 can be made also by turning the separate sheets first 180° about an axis passing through their plane, forming a veneer sheet row of the type 7 and by only then glueing the sheet edges 5 into a veneer sheet web 13. In this case, the veneer sheet webs do not have to be turned as described above. In terms of the yield, the former method is more advantageous, since solid stoppers can be used during the manufacture.

The description above relates to the manufacture of a veneer laminate according to the invention out of an ordinary log, the grain S being parallel to the length of the log. However, the veneer laminate according to the invention can be easily manufactured from logs having a spiral grain, at least by selecting logs with an appropriate spiral. During the turning of such helical logs, the main grain S of the veneer web is not perpendicular to the edge 5 of the web 2, but oblique to this. In the optimal case, if the main grain forms an angle β with the length L1 of the veneer web, the veneer sheets can be cut into squares, which form a veneer laminate by being turned as described above. Thus, the methods are otherwise the same as described above, except that in this particular case the veneer sheets are square and not rhombic. This option may be theoretical, considering that it is probably hard to find logs with an appropriate spiral grain. If the log has a different spiral grain, the cutting directions D must always be picked in accordance with the spirality concerned so that the main grain will form the angle β with the longitudinal direction L2 of the final laminate blank, and so that the grains of superposed veneer layers form a crossing angle α having the size described above.

The edges 5 of the veneer web 2 are of course trimmed if necessary before the sheets are piled into rows 6, 7 in order to ensure sufficiently accurate matching of the joining veneer sheet edges. Other finishings are also usable, such as bevelling the edges to provide a small lap joint between the veneers. Although a rhombus or a square are the preferred shapes of the veneer sheets 3a, 3b, 3c . . . , they may be optionally cut into other shapes, for instance as parallelograms or rectanges, in which H1 is not equal to H2. The main thing is that the cutting direction D forms a section angle β with the main grain and that the sheets are turned in the two ways mentioned above so as to provide a blank for a veneer laminate, in which the grains of the different layers form the crossing angle α with each other.

I claim:

1. A laminated veneer lumber consisting of a plurality of superposed veneer layers (1a, 1b, 1c . . .) with their surfaces glued to each other, wherein the laminated veneer lumber is elongate and extends in a length direction, and each veneer layer has a main grain (S1 or S2) disposed to form a crossing angle (α) between the main grain of immediately superposed veneer layers, the crossing angle (α) being in the range of 5° to 12° and oriented symmetrically about the length direction of the laminated veneer lumber.

2. A method of manufacturing a laminated veneer lumber structure (10) comprising a plurality of superposed veneer layers (1a, 1b, 1c . . .) with their surfaces glued to each other, characterized in that in each veneer layer the main grain (S1 or S2) is disposed to form a crossing angle (α) between the main grain of immediately superposed veneer layers which is in the range of 3° to 20°, the plurality of superposed veneer layers further characterized in that a veneer web (2), having the main grain (S) at least essentially transverse to the length (L) of the web, is cut (4) transversely into square, rhombic, parallelogrammic or rectangular veneer sheets (3a, 3b, 3c . . .) so that the cutting direction (D) forms an angle (β) with the grain (S) which is half of the desired crossing angle (α) between the grains (S1 and S2) of immediately superposed veneer layers (1a and 1b; 1b and 1c; 1c and 1d . . .) in the laminated veneer lumber (10) obtained as the end product;

a first veneer layer (1a) of the laminated veneer lumber is formed by turning the obtained veneer sheets (3) approximately 90° about an axis perpendicular to their plane so that the sheet edges corresponding to the edges (5) of the original veneer web are joined so as to form a veneer sheet row (6);

on top of the veneer layer (1a) of this laminated veneer lumber an immediately superposed second veneer layer (1b) is formed by turning the obtained veneer sheets (3) both 180° about an axis passing through their plane and 90° about an axis perpendicular to their plane, so that the sheet edges corresponding to the edges (5) of the original veneer web join so as to form a second veneer sheet row (7) on top of and attached to the first veneer sheet row;

on top of this second veneer layer (1b) of the laminated veneer lumber, veneer layers (1c, 1d . . .) of the type of the first row (6) and of the type of the second row (7) are formed alternatingly, until the desired thickness of the laminated veneer lumber is reached; and gluing together the veneer layers (1a, 1b, 1c, 1d . . .) of the laminated veneer lumber.

3. A method of manufacturing a laminated veneer lumber structure (10) comprising a plurality of superposed veneer layers (1a, 1b, 1c . . .) with their surfaces glued to each other, characterized in that in each veneer layer the main grain (S1 or S2) is disposed to form a crossing angle (α) between the main grain of immediately superposed veneer layers which is in the range of 3° to 20°, the plurality of superposed veneer layers further characterized in that a veneer web (2), having the main grain (S) at least essentially transverse to the length (L) of the web, is cut (4) transversely into essentially square, rhombic, parallelogrammic or rectangular veneer sheets (3a, 3b, 3c . . .) so that the cutting direction (D) forms an angle (β) with the grain (S) which is half of the desired crossing angle (α) between the grains (S1 and S2) of immediately superposed veneer layers (1a and 1b; 1b and 1c; 1c and 1d . . .) of the laminated veneer lumber (10) obtained as the end product;

a veneer sheet row (6) is formed by turning the obtained veneer sheets (3) approximately 90° about an axis perpendicular to their plane so that the sheet edges corresponding to the edges (5) of the original veneer web are joined;

the joining edges (5) of the veneer sheet row (6) obtained are glued in order to obtain a veneer sheet web (12) for one veneer layer of the laminated veneer lumber;

at least one second veneer sheet row (6) is formed by turning the obtained veneer sheets (3) approximately 90° about an axis perpendicular to their plane so that the sheet edges corresponding to the edges (5) of the original veneer web are joined;

the joining edges (5) of each veneer sheet row (6) are glued to each other to obtain at least one second veneer sheet web (13) for one veneer layer of the laminated veneer lumber;

two superposed veneer layers (1a and 1b) of the laminated veneer lumber are formed by turning the second veneer sheet web (13) 180° about an axis in the longitudinal direction of the web and by placing it on top of the first veneer sheet web (12) with parallel longitudinal directions;

forming on top of the second veneer layer (1b) of the laminated veneer lumber veneer layers (1c, 1d . . . ) alternatingly of the type of the first veneer sheet web (12) and of the type of the second veneer sheet web (13), until the desired thickness of the laminated veneer structure is reached; and gluing together the veneer layers (1a, 1b, 1c, 1d . . . ) of the laminated veneer lumber.

4. A method according to claim 2 or 3, the main grain (S) being essentially perpendicular to the longitudinal direction (L) of the veneer web, characterized in that the cutting direction (D) forms a section angle ($\beta$), which is half of the desired crossing angle ($\alpha$) between immediately superposed veneer layers (1a, 1b, 1c . . . ) of the end product, with the normal to the longitudinal edge (5) of the veneer web.

5. A method according to claim 2 or 3, the main grain (S) not being essentially perpendicular to the longitudinal direction (L) of the veneer web, characterized in that the cutting direction (D) forms either an essentially right section angle with the longitudinal direction (L) of the veneer web (2) or a section angle deviating from this, in that the main grain (S) of the veneer sheets (3) forms a section angle ($\beta$) with the cutting direction (D) which is half of the desired crossing angle ($\alpha$) between immediately superposed veneer layers in the end product.

6. A method according to claim 5, characterized in that the log from which the veneer web (2) is turned is selected as a wooden blank with such a grain spiral that the main grain (S) of the web forms the section angle ($\beta$) with the normal to the longitudinal side (5), the veneer sheets (3) being square.

7. A method according to any of claims 2 or 3, characterized in that the veneer web (2) is formed either of a whole turned veneer, a row of separate veneer sheets or a row of veneer sheets with their edges glued to each other.

8. A method according to claim 4, characterized in that the veneer web (2) is formed either of a whole turned veneer, a row of separate veneer sheets or a row of veneer sheets with their edges glued to each other.

9. A method according to claim 5, characterized in that the veneer web (2) is formed either of a whole turned veneer, a row of separate veneer sheets or a row of veneer sheets with their edges glued to each other.

10. A method according to claim 6, characterized in that the veneer web (2) is formed either of a whole turned veneer, a row of separate veneer sheets or a row of veneer sheets with their edges glued to each other.

11. The laminated veneer lumber of claim 1, wherein each veneer layer comprises a plurality of parallelogrammic veneer sheets, each veneer sheet having opposing faces and peripheral edges, the peripheral edges intersecting at angles other than perpendicular, the peripheral edges including opposing edges with the main grain of the sheet oriented substantially perpendicular to said opposing edges, the veneer sheets of the same veneer layer being aligned in abutment with each other along respective opposing edges so that the main grains of the aligned veneer sheets are disposed at an angle ($\beta$) relative to the length direction of the veneer lumber which is half of the crossing angle ($\alpha$).

* * * * *

UNITED STATES PATENT AND TRADEMARK OFFICE
CERTIFICATE OF CORRECTION

PATENT NO.  : 5,507,905
DATED       : April 16, 1996
INVENTOR(S) : Matti Kairi

It is certified that error appears in the above-indentified patent and that said Letters Patent is hereby corrected as shown below:

Column 5, line 52, "rectanges" should be --rectangles--.

Signed and Sealed this

First Day of October, 1996

Attest:

BRUCE LEHMAN

Attesting Officer

Commissioner of Patents and Trademarks